United States Patent
Classon et al.

(10) Patent No.: US 8,073,062 B2
(45) Date of Patent: Dec. 6, 2011

(54) METHOD AND APPARATUS FOR DOWNLINK RESOURCE ALLOCATION IN AN ORTHOGONAL FREQUENCY DIVISION MULTIPLEXING COMMUNICATION SYSTEM

(75) Inventors: Brian K. Classon, Palatine, IL (US); Kevin L. Baum, Rolling Meadows, IL (US); Amitava Ghosh, Buffalo Grove, IL (US); Robert T. Love, Barrington, IL (US); Vijay Nangia, Algonquin, IL (US); Rapeepat Ratasuk, Hoffman Estates, IL (US); Weimin Xiao, Hoffman Estates, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 980 days.

(21) Appl. No.: 12/023,054

(22) Filed: Jan. 31, 2008

(65) Prior Publication Data
US 2008/0192847 A1 Aug. 14, 2008

Related U.S. Application Data

(60) Provisional application No. 60/888,833, filed on Feb. 8, 2007.

(51) Int. Cl.
*H04K 1/10* (2006.01)
*H04L 27/28* (2006.01)
(52) U.S. Cl. ...................................................... 375/260
(58) Field of Classification Search .................. 375/259, 375/260, 267, 295, 316, 340, 261, 299; 370/203, 370/208, 252, 322, 329, 332, 335, 341, 480; 455/450, 452.2, 571
See application file for complete search history.

(56) References Cited

U.S. PATENT DOCUMENTS

| | | | |
|---|---|---|---|
| 2005/0111406 A1* | 5/2005 | Pasanen et al. | 370/329 |
| 2006/0039274 A1* | 2/2006 | Park et al. | 370/208 |
| 2007/0004465 A1* | 1/2007 | Papasakellariou et al. | 455/571 |
| 2007/0110104 A1 | 5/2007 | Sartori et al. | |
| 2007/0220151 A1* | 9/2007 | Li et al. | 709/226 |
| 2007/0242636 A1* | 10/2007 | Kashima et al. | 370/329 |
| 2010/0008435 A1* | 1/2010 | Jung et al. | 375/260 |

OTHER PUBLICATIONS

TSG-RAN WG1 LTE Ad Hock, R1-060095, E-UTRA DL- Localized and distributed transmission, Ericsson, Helsinki, Finland, Jan. 23-25, 2006, pp. 1-3.
Monogioudis, Pantelis et al.: LNS proposal for Air Interface Evolution Phase 2, TSG-C WG3, 3rd Generation Partnership Project 2, 3GPP2, C30-20060116-027, pp. 1-119.

* cited by examiner

*Primary Examiner* — David C. Payne
*Assistant Examiner* — Syed Haider

(57) ABSTRACT

A communication is provided that schedules both Distributed Virtual Resource Blocks (DVRB) and Localized Virtual Resource Blocks (LVRB) in a same frequency channel, thereby obtaining the benefits of frequency selective scheduling while minimizing the uplink feedback overhead. In one embodiment of the invention, the communication system assigns one or more downlink Physical Resource Blocks (PRBs) of multiple downlink Physical Resource Blocks (PRBs) to each user equipment (UE) given an LVRB to produce at least one reserved PRB and multiple non-reserved PRBs and assigns a part of each PRB of the multiple non-reserved PRBs to a UE given a DVRB. In another embodiment of the invention, the communication system assigns PRBs pre-reserved for localized transmission to UEs scheduled for LVRBs and assigns parts of multiple PRBs pre-reserved for distributed transmission to each UE given a DVRB.

21 Claims, 5 Drawing Sheets

|         |       |              |
|---------|-------|--------------|
| ... | UE IDs | ... | 0 1 1 0 1 | ... |

600

| N_DVRB | S  | Bitmap       |
|--------|----|--------------|
| 1      | 12 | 100000000000 |
| 2      | 6  | 100000100000 |
| 3      | 4  | 100010001000 |
| 4      | 3  | 100100100100 |
| 5      | 3  | 110100100100 |
| 6      | 2  | 101010101010 |
| 7      | 2  | 111010101010 |
| 8      | 2  | 111110101010 |
| 9      | 2  | 111111101010 |
| 10     | 2  | 111111111010 |
| 11     | 2  | 111111111110 |
| 12     | 1  | 111111111111 |

700

US 8,073,062 B2

METHOD AND APPARATUS FOR DOWNLINK RESOURCE ALLOCATION IN AN ORTHOGONAL FREQUENCY DIVISION MULTIPLEXING COMMUNICATION SYSTEM

CROSS-REFERENCE(S) TO RELATED APPLICATION(S)

The present application claims priority from provisional application Ser. No. 60/888,833, entitled "METHOD AND APPARATUS FOR DOWNLINK RESOURCE ALLOCATION IN AN ORTHOGONAL FREQUENCY DIVISION MULTIPLEXING COMMUNICATION SYSTEM," filed Feb. 8, 2007, which is commonly owned and incorporated herein by reference in its entirety.

FIELD OF THE INVENTION

The present invention relates generally to Orthogonal Frequency Division Multiplexing (OFDM) communication systems and, in particular, to downlink resource allocation in an OFDM communication system.

BACKGROUND OF THE INVENTION

Orthogonal Frequency Division Multiple Access (OFDMA) modulation schemes have been proposed for downlink transmissions over an air interface in next generation communication systems such as 3GPP (Third Generation Partnership Project) E-UTRA (Evolved UMTS Terrestrial Radio Access) and 3GPP2 Phase 2 communication systems. In an OFDMA communication system, a frequency channel, or bandwidth, is split into multiple contiguous frequency sub-bands (also known as resource blocks (RBs)). In turn, each sub-band comprises multiple, for example, 12, contiguous frequency sub-carriers that are orthogonal to each other. Under the 3GPP E-UTRA standards, a Node B then assigns resource blocks to users equipment (UEs) on a sub-frame basis, wherein a sub-frame has a duration of one millisecond (ms). Within one sub-frame, distributed (for frequency diversity) and localized (resource block-based) transmission modes are multiplexed in an FDM manner.

In a 3GPP E-UTRA communication system, a Physical Resource Block (PRB) consists of a set of contiguous sub-carriers (for example, 12) over a number of OFDM symbols (for example, 12). A PRB contains data from only a localized user or distributed users but not both. However, UEs are not assigned a PRB. Instead, UEs are assigned a Virtual Resource Block (VRB), which is a logical resource block that is associated with a same number of sub-carriers, again, 12 for example, as a PRB. The VRB is then mapped to one or more PRBs. Two separate schemes have been proposed for such mappings. One scheme, known as a Localized VRB (LVRB), maps a VRB into a single PRB, that is, maps the 12 sub-carriers of a VRB to the 12 sub-carriers of a corresponding PRB. Localized mapping is used for Frequency Selective Scheduling (FSS), wherein transmission errors are minimized by scheduling a user equipment (UE) for a PRB only where the UE is known to have a good downlink channel. Accordingly, FSS requires narrowband channel feedback from the UE. A narrowband channel feedback is specific to each PRB while wideband channel feedback is the channel quality over the whole bandwidth. A second scheme, known as a Distributed VRB (DVRB), maps a VRB into multiple PRBs, that is, the 12 sub-carriers of a VRB are mapped to one or more sub-carriers of each of multiple PRBs. Distributed mapping is used for Frequency Diverse Scheduling (FDS), wherein a VRB is distributed among multiple PRBs without channel feedback or only wideband channel feedback and thus reduces the potential for transmission errors by use of frequency diversity.

An LVRB is most efficient for high data rate users and data transfer applications, such as File Transfer Protocol (FTP), where low error rates are required. However, an LVRB requires narrowband channel quality feedback, typically for each LVRB that may be scheduled, which consumes uplink system capacity. By contrast, a DVRB may be more efficient for services such as VoIP, as it may use distributed transmission and require very little or no feedback.

Therefore, a need exists for a method and apparatus that can maximize bandwidth utilization and minimize transmission errors by scheduling both DVRBs and LVRBs in a same frequency channel, such that the benefits of frequency selective scheduling is obtained while minimizing the uplink feedback overhead.

Figure 1:
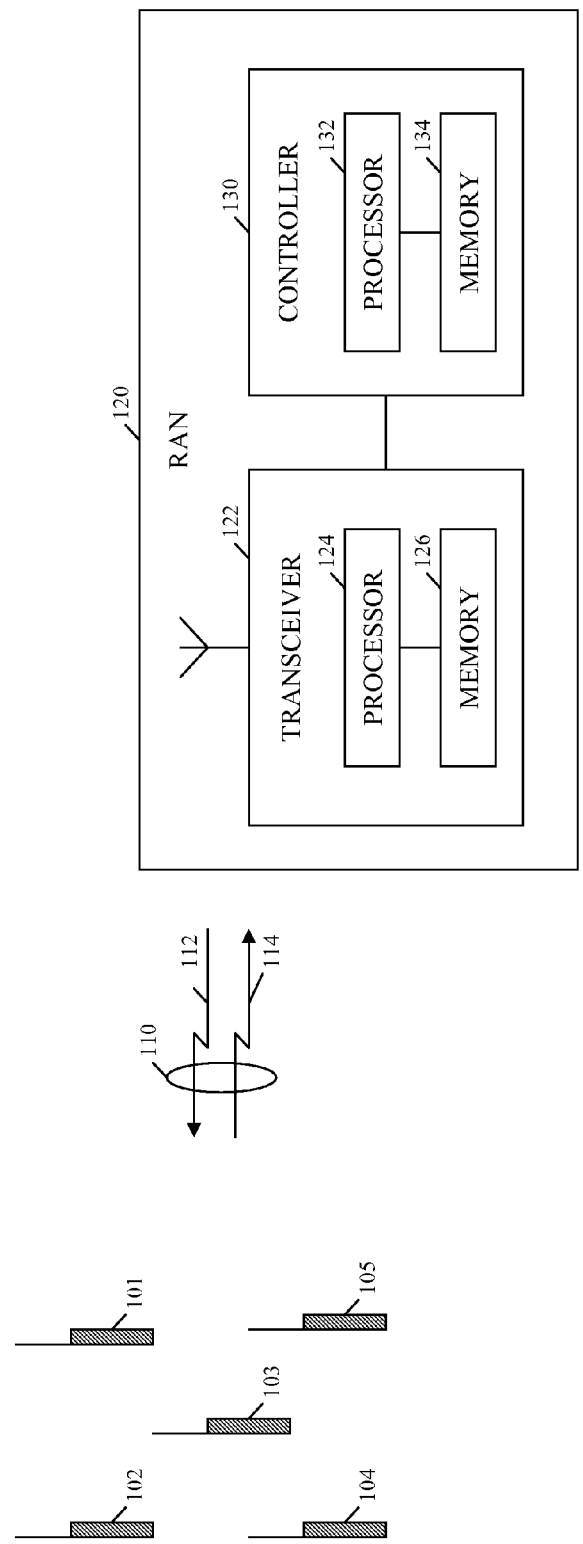
FIG. 1 is a block diagram of a wireless communication system in accordance with an embodiment of the present invention.

One of ordinary skill in the art will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION OF THE INVENTION

To address the need for a method and apparatus that can maximize bandwidth utilization and minimize transmission errors by scheduling both Distributed Virtual Resource Blocks (DVRBs) and Localized Virtual Resource Blocks (LVRBs) in a same frequency channel, such that the benefits of frequency selective scheduling is obtained while minimizing the uplink feedback overhead, a communication system is provided that assigns one or more downlink Physical Resource Blocks (PRBs) of multiple downlink PRBs to each user equipment (UE) given an LVRB to produce at least one reserved Physical Resource Block (PRB) and multiple non-reserved PRBs and assigns a part of each PRB of the multiple non-reserved PRBs to a UE given a DVRB. In another embodiment of the invention, the communication system assigns PRBs pre-reserved for localized transmission to UEs scheduled for LVRBs and assigns parts of multiple PRBs pre-reserved for distributed transmission to each UE given a DVRB.

Generally, an embodiment of the present invention encompasses a method for resource allocation in an Orthogonal Frequency Division Multiplexing (OFDM) communication system including scheduling at least one UE for a localized transmission and at least one UE for a distributed transmission, assigning one or more downlink PRBs of multiple downlink PRBs to each user equipment scheduled for a localized transmission to produce at least one reserved PRB and multiple non-reserved PRBs, and assigning a part of each PRB of the multiple non-reserved PRBs to a UE scheduled for a distributed transmission.

Another embodiment of the present invention encompasses a method for resource allocation in an OFDM communication system including pre-reserving a first one or more downlink PRBs of multiple downlink PRBs for localized transmissions and a second one or more downlink PRBs of the multiple downlink PRBs for distributed transmission, scheduling at least one UE for a localized transmission and at least one UE for a distributed transmission, assigning a PRB of the first one or more PRBs to a UE scheduled for a localized transmission, and assigning a part of each PRB of the second one or more PRBs to a UE scheduled for a distributed transmission.

Yet another embodiment of the present invention encompasses a network element capable of operating in an OFDM communication system, the network element configured to schedule at least one UE for a localized transmission and at least one UE for a distributed transmission, assign one or more downlink Physical Resource Blocks (PRBs) of multiple downlink PRBs to each UE scheduled for a localized transmission to produce at least one reserved Physical Resource Block (PRB) and multiple non-reserved PRBs, and assign a part of each PRB of the multiple non-reserved PRBs to a UE scheduled for a distributed transmission.

Still another embodiment of the present invention encompasses a network element capable of operating in an OFDM communication system, the network element configured to maintain a list of multiple pre-reserved downlink PRBs, wherein a first one or more downlink PRBs of the multiple downlink PRBs is reserved for localized transmissions and a second one or more downlink PRBs of the multiple downlink PRBs is reserved for distributed transmission, schedule at least one UE for a localized transmission and at least one UE for a distributed transmission, assign a Physical Resource Block (PRB) of the first one or more PRBs to a UE scheduled for a localized transmission, and assign a part of each PRB of the second one or more PRBs to a UE scheduled for a distributed transmission.

The present invention may be more fully described with reference to FIGS. 1-7. FIG. 1 is a block diagram of a wireless communication system 100 in accordance with an embodiment of the present invention. Communication system 100 includes multiple users equipment (UEs) 101-105, such as a cellular telephone, a radiotelephone, a pager, or a Personal Digital Assistant (PDA), personal computer (PC), or laptop computer equipped for wireless communications. Other examples of user equipment are possible. Each user equipment (UE) 101-105 has an associated user and is provided wireless communication services by a radio access network (RAN) 120 via an air interface 110. RAN 120 includes a transceiver 122, such as a Node B or a base transceiver station (BTS), coupled to a controller 130, such a radio network controller (RNC) or a base station controller (BSC), and each of transceiver 122 and controller 130 may be referred to herein as a network element of communication system 100. Air interface 110 comprises a downlink 112 and an uplink 114. Each of downlink 112 and uplink 114 comprises multiple physical communication channels, including multiple control channels and multiple traffic channels.

Each of transceiver 122 and controller 130 includes a respective processor 124, 132 such as one or more microprocessors, microcontrollers, digital signal processors (DSPs), combinations thereof or such other devices known to those having ordinary skill in the art. The particular operations/functions of processors 124 and 132, and respectively thus of transceiver 122 and controller 130, are determined by an execution of software instructions and routines that are stored in a respective at least one memory device 126, 134 associated with the processor, such as random access memory (RAM), dynamic random access memory (DRAM), and/or read only memory (ROM) or equivalents thereof, that stores data and programs that may be executed by the corresponding processor. The at least one memory device 126 of transceiver 122 further stores an identifier, such as a 'UE_ID,' associated with each UE serviced by the transceiver.

Figure 2:
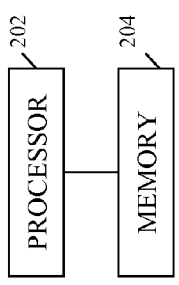
FIG. 2 is a block diagram of a user equipment of FIG. 1 in accordance with an embodiment of the present invention.

Referring now to FIG. 2, a block diagram is provided of UEs 101-105 in accordance with an embodiment of the present invention. Each of UEs 101-105 includes a processor 202, such as one or more microprocessors, microcontrollers, digital signal processors (DSPs), combinations thereof or such other devices known to those having ordinary skill in the art. The particular operations/functions of processor 202, and thus of each of UEs 101-105, is determined by an execution of software instructions and routines that are stored in a respective at least one memory device 204 associated with the processor, such as random access memory (RAM), dynamic random access memory (DRAM), and/or read only memory (ROM) or equivalents thereof, that store data and programs that may be executed by the corresponding processor. The at least one memory device 204 of each UE 101-105 further stores an identifier associated with the UE, such as a UE_ID. When transceiver 122 broadcasts a message to UE 101-105, each UE is able to determine whether it is an intended recipient of the message based on UE identifiers, for example, UE-IDs, included in the message.

Unless otherwise specified herein, the embodiments of the present invention preferably are implemented within UEs 101-105 and transceiver 122, and more particularly with or in software programs and instructions stored in the respective at least one memory device 204, 126 and executed by the respective processors 202, 124 of the UEs and transceiver. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UEs 101-105 and transceiver 122. Based on the present disclosure, one skilled in the art will be readily capable of producing and implementing such software and/or hardware without undo experimentation. Furthermore, in other embodiments of the present invention, one or more functions described herein as being performed by transceiver 122 instead may be performed by controller 130, and more particularly by processor 132 of the controller.

Communication system 100 comprises a wideband packet data communication system that employs an Orthogonal Frequency Division Multiple Access (OFDMA) modulation scheme for transmitting data over air interface 120, wherein a frequency channel, or bandwidth, is split into multiple frequency sub-bands, wherein each sub-band, or resource block, comprises multiple orthogonal frequency sub-carriers that are the physical layer channels over which traffic and signaling channels are transmitted in a TDM or TDM/FDM fashion. A user may then be assigned one or more of the resource blocks for an exchange of bearer information, thereby permitting multiple users to transmit simultaneously on the different resource blocks such that each user's transmission is orthogonal to the other users' transmissions. Further, communication system 100 preferably operates in accordance with the 3GPP (Third Generation Partnership Project) E-UTRA (Evolutionary UMTS Terrestrial Radio Access) standards, which standards specify wireless telecommunications system operating protocols, including radio system parameters and call processing procedures. However, those who are of ordinary skill in the art realize that communication system 100 may operate in accordance with any wireless telecommunication system employing an Orthogonal Frequency Division Multiplexing (OFDM) modulation scheme, such as a 3GPP2 (Third Generation Partnership Project 2) Evolution or Phase 2 communication system, for example, a CDMA (Code Division Multiple Access) 2000 1XEV-DV communication system, a Wireless Local Area Network (WLAN) communication system as described by the IEEE (Institute of Electrical and Electronics Engineers) 802.xx standards, for example, the 802.11a/HiperLAN2, 802.11 g, or 802.16 standards, or any of multiple proposed ultrawideband (UWB) communication systems.

Figure 3:
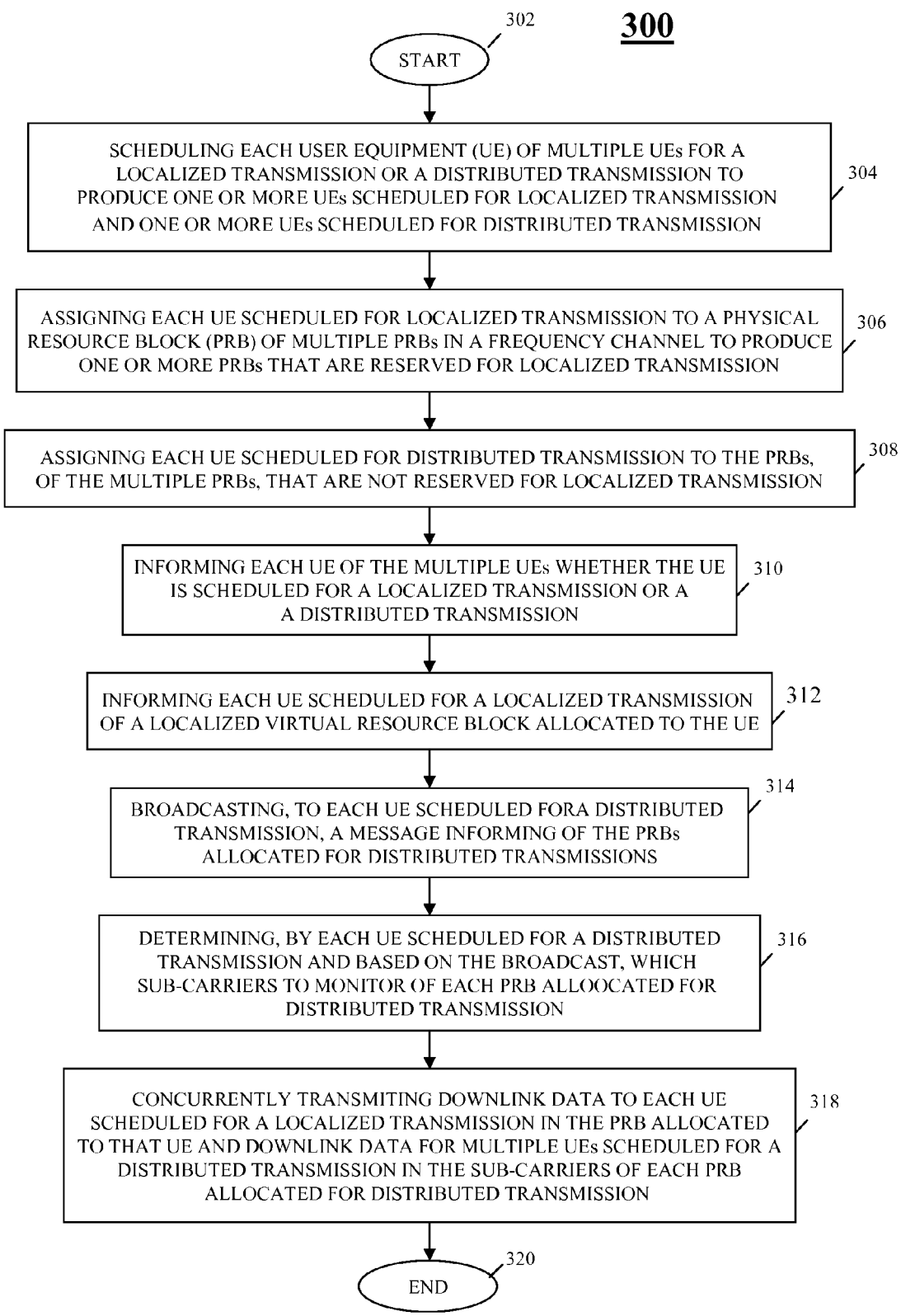
FIG. 3 is a logic flow diagram of a method executed by the communication system of FIG. 1 in multiplexing of Localized Virtual Resource Blocks and Distributed Virtual Resource Blocks in accordance with an embodiment of the present invention.
Figure 4:
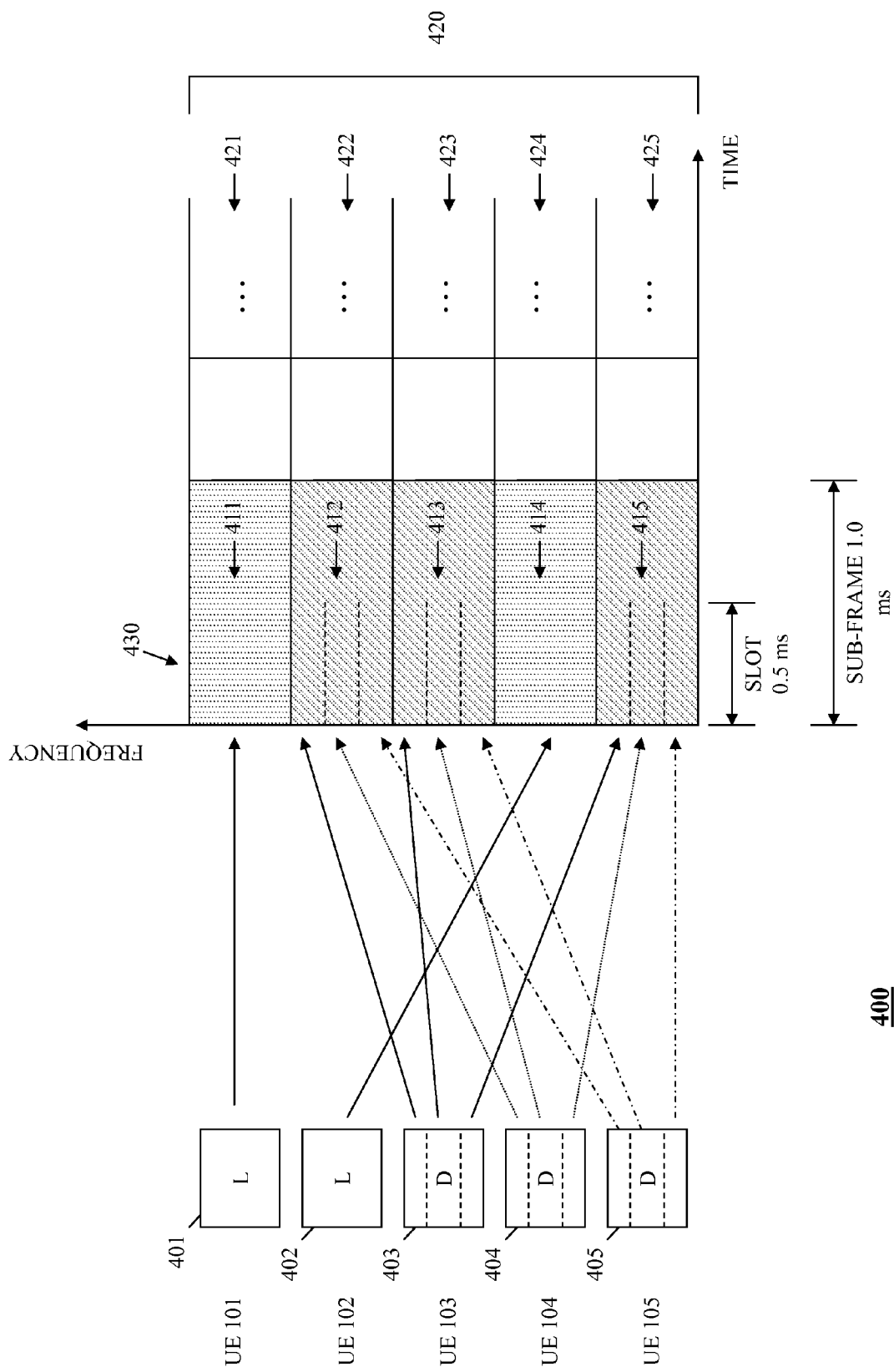
FIG. 4 is an exemplary block diagram depicting a mapping of Virtual Resource Blocks to Physical Resource Blocks by the communication system of FIG. 1 in accordance with an embodiment of the present invention.
Figure 5:
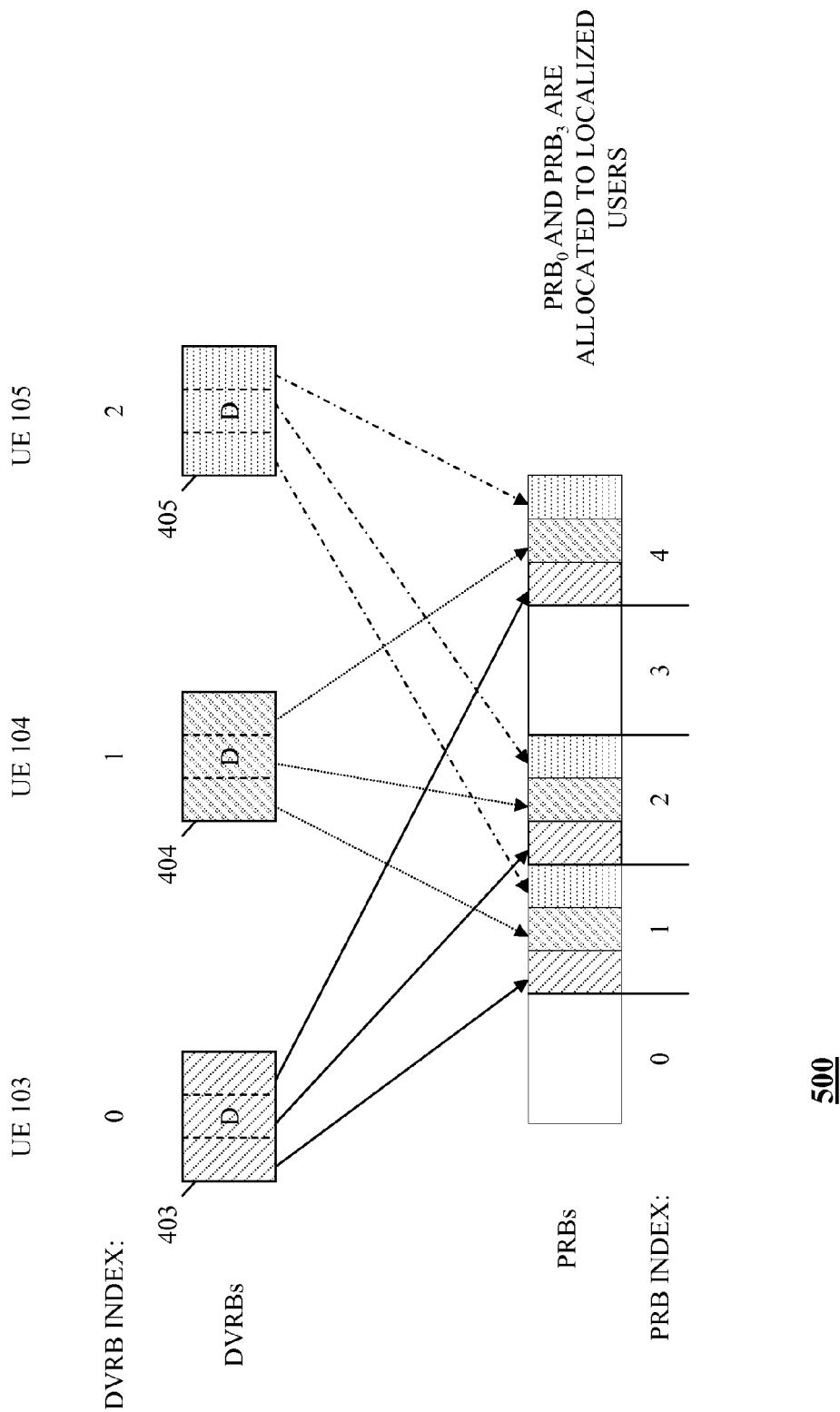
FIG. 5 is an exemplary block diagram depicting another perspective of a mapping of Virtual Resource Blocks to Physical Resource Blocks by the communication system of FIG. 1 in accordance with an embodiment of the present invention.

Referring now to FIGS. 3-5, a method is illustrated by which communication system 100 multiplexes Localized Virtual Resource Blocks (LVRBs) and Distributed Virtual Resource Blocks (DVRBs) in a Frequency Division Multiplexing (FDM) manner, preferably on a sub-frame-by-sub-frame basis, in accordance with an embodiment of the present invention. FIG. 3 is a logic flow diagram 300 of a method executed by communication system 100 in multiplexing of LVRBs and DVRBs in accordance with an embodiment of the present invention. FIGS. 4 and 5 are exemplary block diagrams 400, 500 depicting a mapping of Virtual Resource Blocks (VRBs) to Physical Resource Blocks (PRBs) by communication system 100 in accordance with an embodiment of the present invention. FIGS. 4 and 5 are provided for the purpose of illustrating the principles of the present invention and are not intended to limit the invention in any way. FIGS. 4 and 5 depict a given frequency channel, or bandwidth, 420 that is divided into multiple sub-bands 421-425 (five shown). Frequency channel 420 is graphically depicted on a vertical axis that represents frequency and a horizontal axis that represents time. Each sub-band 421-425 corresponds to a respective Physical Resource Block (PRB) 411-415 during a given time slot 430. Each sub-band/PRB includes multiple frequency sub-carriers, for example, 12 sub-carriers in a 3GPP E-UTRA communication system.

Logic flow diagram 300 begins (302) when transceiver 122 schedules (304) each UE 101-105 for a localized transmission or a distributed transmission, producing one or more UEs scheduled for localized transmission and one or more UEs scheduled for distributed transmission. For example, transceiver 122 gives a first UE 101 of the multiple UEs 101-105 a first VRB 401, gives a second UE 102 of the multiple UEs 101-105 a second VRB 402, gives a third UE 103 of the multiple UEs 101-105 a third VRB 403, gives a fourth UE 104 of the multiple UEs 101-105 a fourth VRB 404, and gives a fifth UE 105 of the multiple UEs 101-105 a fifth VRB 405. Further, as depicted in FIG. 4, transceiver 122 schedules the first and second UEs 101 and 102 for localized transmission, that is, they are given LVRBs (their VRBs are designated LVRBs), and schedules the third, fourth, and fifth UEs 103-105 for distributed transmission, that is, they are given DVRBs (their VRBs are designated DVRBs). Transceiver 122 may determine whether to schedule a UE for a localized or a distributed transmission based on an application or service activated or requested by the UE, a quality of service (QoS) requested by, or negotiated with, the UE, or any other parameter known to one or ordinary skill in the art that is used to determine whether a UE should be a localized bandwidth user or a distributed bandwidth user. Although FIGS. 3-5 show each UE 101-105 being assigned a single VRB (LVRB or DVRB), in general each UE may be assigned multiple VRBs. For example, a first UE 101 may be given VRBs 401 and 402 for localized transmission (LVRBs), and a second UE 102 may be given VRBs 403 and 404 for distributed transmission (DVRBs). While each LVRB is for localized transmission on a PRB of a number of contiguous sub-carriers, in contrast to each DVRB, the UE given a number of LVRBs may be constrained to contiguous or non-contiguous PRBs. The 'localized' assignment of multiple LVRBs may be called resource block-based allocation.

Transceiver 122 first assigns (306) each UE scheduled for localized transmission, that is, maps each LVRB 411, 412 associated with UEs 101 and 102, to a Physical Resource Block (PBR) of frequency channel 420 to produce a first set of PRBs that are reserved for localized transmission. That is, transceiver 122 maps the LVRB of each of UEs 101 and 102 to the sub-carriers of one PRB 411-415 of the frequency bandwidth. For example, as depicted in FIG. 4, transceiver 122 maps LVRB 401 associated with UE 101 to PRB 411 and maps LVRB 402 associated with UE 102 to PRB 414. PRBs 411 and 414 respectively are allocated to each of UEs 101 and 102 based on channel condition feedback provided by UEs 101 and 102 to transceiver 122, such as Channel Quality Information (CQI) messages conveyed by the UEs to the transceiver as is known in the art. As is known in the art, CQI messages typically include channel quality measurements for each sub-band, such as sub-bands 421-425, of a given frequency bandwidth. Transceiver 122 then maps each UE 101, 102 to a sub-band with good channel conditions as reported by the UE.

Transceiver 122 then assigns (308) each UE scheduled for distributed transmission, that is, maps each DVRB 412, 413, 415 associated UEs 103-105, to the remaining PRBs of the frequency bandwidth, that is, the PRBs 412, 413, 415 that are not reserved for localized transmission to produce a second set of allocated PRBs that are allocated for distributed transmission. In one embodiment of the present invention, the PRBs allocated for localized transmissions and distributed transmissions may be predetermined. That is, a first one or more PRBs, that is, PRBs 411 and 414, may be pre-reserved for localized transmission and a second one or more PRBs, that is, PRBs 412, 413, and 415, may be pre-reserved for distributed transmission prior to their allocation to UEs 101-105. Transceiver 122 may pre-reserve the PRBs 411-415 and/or the transceiver may store a list of the pre-reserved PRBs 411-415 in the at least one memory device 126 of the transceiver. In the event that the PRBs 411-415 are pre-reserved for localized and distributed transmission, if only one UE is scheduled for localized transmission, then one of the PRBs 411, 414 pre-reserved for localized transmission may sit idle. If more UEs are scheduled for localized transmission than there are corresponding pre-reserved PRBs, transceiver 122 may steal PRBs from the PRBs pre-reserved for distributed transmission. In the event that the PRBs allocated for localized transmission and distributed transmission are pre-determined, the PRBs may be allocated to the UEs scheduled for localized transmission and distributed transmission in any order.

In another embodiment of the present invention, the PRBs allocated for localized transmission and distributed transmission may be dynamically determined. That is, transceiver 122 may determine a quantity of UEs to schedule for localized transmission and a quantity of UEs to schedule for distributed transmission and then allocate the PRBs accordingly. In such an event, transceiver 122 first allocates PRBs to the UEs scheduled for localized transmission, that is, UEs 101 and 102, and then allocates the remaining PRBs to the UEs scheduled for distributed transmission. In this way, a likelihood that PRBs may sit idle may be reduced.

When mapping the DVRBs 403-405 associated with each UE 103-105 scheduled for distributed transmission to PRBs 412, 413, and 415, transceiver 122 maps a DVRB associated with each UE 103-105 to one or more sub-carriers of each of the multiple PRBs 412, 413, 415 that are not reserved for localized transmission, that is, the distributed transmission PRBs. More particularly, transceiver 122 maps each sub-carrier of a DVRB to a sub-carrier of one of the multiple PRBs 412, 413, 415 while also making sure that the sub-carriers of a DVRB are not all mapped to a same PRB, that is, that the DVRB's sub-carriers are distributed among the different distributed transmission PRBs.

As a result, a PRB will comprise data from only a LVRB or a DVRB, but not both. While an LVRB will map to a single PRB, a DVRB will map to multiple PRBs. A size of an LVRB ('$S_{VL}$') is equal to a number of data modulation symbols within a PRB ('$N_{MS}$'), which may be less than or equal to a number of OFDM symbols in a sub-frame times a number of sub-carriers in a PRB as some of the time-frequency resources in a PRB may be used for other purposes such as reference signals and control. In general, the size of each PRB of the set of PRBs, and the size of an LVRB mapped to that PRB, may not be the same or only be substantially the same, as the amount of time-frequency resources used for other purposes may be different in different PRBs. If not the same, the embodiments below may be modified accordingly in a straightforward manner. A size of a DVRB ('$S_{VD}$' or '$S_{DVRB}$') is the same as the size of an LVRB. A number of PRBs used for localized scheduling in a frame, that is, reserved for the LVRBs, may be represented as $N_{LVRB}$. These PRBs need not be contiguous. Further, a total number of available PRBs in a given bandwidth is $N_{PRB}$. A number of PRBs available for use by the distributed users ('$N_{DPRB}$'), that is, for mapping of the DVRBs, then is given by, $N_{DPRB}=N_{PRB}-N_{LVRB}$.

Since the size of a DVRB is the same as a PRB, the maximum number of DVRBs ('$N_{DPRB}$') is the same as $N_{DPRB}$. As the DVRBs are mapped to the PRBs not reserved for the localized users, such as, UEs 101-102, the PRBs available for the distributed users, such as, UEs 103-105, may be indexed by i, wherein i=0, 1, 2, . . . , $N_{DVRB}$−1. Each DVRB may be split into $N_{DVRB}$ parts, wherein each of the $N_{DVRB}$ parts is placed in one of the $N_{DPRB}$ PRBs assigned for distributed allocations. For an $i^{th}$ DVRB, or DVRB$_i$, each part of the $i^{th}$ DVRB may be represented as part $P_{i,j}$, wherein the subscript 'i j' indicates that this is the $j^{th}$ part of the $i^{th}$ DVRB.

Measured in modulation symbols, the size ('$S_{i,j}$') of part $P_{i,j}$ is given by $$S_{i,j} = S_{DVRB} - (N_{DVRB} - 1) * \left\lfloor \frac{S_{DVRB}}{N_{DPRB}} \right\rfloor \text{ if } j = i$$

$$S_{i,j} = \left\lfloor \frac{S_{DVRB}}{N_{DPRB}} \right\rfloor \text{ else}$$

Thus the $j^{th}$ PRB will contain DVRB parts $P_{i,j}$ for i=0, 1, 2, . . . , $N_{DVRB}$−1. The offset of each such part, that is, the offset of the part from DVRB$_i$ inserted in the $j^{th}$ PRB, may then be equal to the DVRB index, or counter, i. The parts of each DVRB may be of equal size, or as indicated above one part may have a larger size than the others. Having the larger part with index i=j ensures that no more than one larger size part from a DVRB is in each PRB.

Referring now to FIG. 5, preferably the modulation symbols of part $P_{i,j}$ are mapped to the $j^{th}$ PRB in a time first manner (first to last OFDM symbols on a sub-carrier before filling a next sub-carrier). It is up to a designer of communication system 100 whether to restrict a size of the parts $P_{i,j}$ to an integer number of sub-carriers (replace $N_{MS}$ in the above-equations with 'M,' where M is the number of sub-carriers in a PRB) or to restrict a number of parts that a DVRB may be sub-divided into, for example, 12 when there are 12 sub-carriers in a PRB. If the number of DVRBs is more than the maximum number of parts that a DVRB may be sub-divided into, the PRBs for distributed transmission may be divided into multiple groups, with the procedures applied to each group. In various embodiments of the present invention, the members of a group of PRBs may be selected based on being closest to each other among the PRBs for distributed transmission or may each be separated by a known number of PRBs.

For example, as depicted in FIG. 4, each of DVRBs 403-405 may be divided into three parts, or three sets of sub-carriers, wherein the number of parts or sets of sub-carriers of each DVRB corresponds to the number (three) of PRBs 412, 413, 415 not reserved for localized transmission. In turn, the sub-carriers of each of the PRBs not reserved for localized transmission may be divided into a corresponding number (three) of parts, or sets of sub-carriers, wherein the number of parts or sets of sub-carriers of each PRB 412, 413, 415 not reserved for localized transmission corresponds to the number (three) of DVRBs being mapped to the PRBs. Transceiver 122 then maps each part, or set of sub-carriers, of a first DVRB to a first part, or set of sub-carriers, of each of the multiple distributed transmission PRBs 412, 413, 415, maps each part, or set of sub-carriers, of a second DVRB to a second part, or set of sub-carriers, of each of the multiple distributed transmission PRBs 412, 413, 415, maps each part, or set of sub-carriers, of a third DVRB to a third part, or set of sub-carriers, of each of the multiple distributed transmission PRBs 412, 413, 415, and so on.

For example, transceiver 122 may map a first set of the three sets of sub-carriers of a first DVRB 403 of the multiple DVRBs 403-405 to a first set of sub-carriers of a first PRB 412 of the multiple distributed transmission PRBs 412, 413, 415, map a second set of the three sets of sub-carriers of the first DVRB 403 to a first set of sub-carriers of a second PRB 413 of the multiple distributed transmission PRBs 412, 413, 415, and map a third set of the three sets of sub-carriers of the first DVRB 403 to a first set of sub-carriers of a third PRB 415 of the multiple distributed transmission PRBs 412, 413, 415. Similarly, transceiver 122 may map a first set of the three sets of sub-carriers of a second DVRB 404 of the multiple DVRBs 403-405 to a second set of sub-carriers of the first PRB 412, map a second set of the three sets of sub-carriers of the second DVRB 404 to a second set of sub-carriers of the second PRB 413, and map a third set of the three sets of sub-carriers of the second DVRB 404 to a second set of sub-carriers of the third PRB 415. And transceiver 122 may map a first set of the three sets of sub-carriers of a third DVRB 405 of the multiple DVRBs 403-405 to a third set of sub-carriers of the first PRB 412, maps a second set of the three sets of sub-carriers of the third DVRB 405 to a third set of sub-carriers of the second PRB 413, and maps a third set of the three sets of sub-carriers of the third DVRB 405 to a third set of sub-carriers of the third PRB 415. Thus the sub-carriers associated with each DVRB 403-405 are distributed among the multiple non-reserved PRBs 412, 413, and 415.

Transceiver 122 further informs (310) each UE 101-105 whether the UE is scheduled for a localized transmission or a distributed transmission. With respect to UEs 101, 102 scheduled for a localized transmission, transceiver 122 further informs each UE of the LVRB reserved for the UE. For example, with respect to the UEs 101, 102 scheduled for a localized transmission, transceiver 122 informs (312) each such UE, via a control channel of downlink 112, that it is scheduled for a localized transmission and of the LVRB allocated to that UE. Based on the received information, each of UEs 101 and 102 is able to determine a respective PRB 411, 414 to monitor for a downlink transmission.

With respect to UEs 103-105 scheduled for a distributed transmission, transceiver 122 broadcasts (314) a control message to each such UE via a control channel (for example, a Primary Broadcast Control Channel (P-BCH) or a Secondary Broadcast Control Channel (S-BCH) or a DL L1/L2 (Downlink Layer 1/Layer 2) control channel) of downlink 112 that informs of the PRBs 412, 413, 415 allocated for distributed transmissions. Based on a number of PRBs allocated for distributed transmission, and an ordering of the UEs scheduled for distributed transmissions, each distributed transmission UE 103-105 is able to determine (316) which sub-carrier(s) of each distributed transmission PRB 412, 413, and 415 to monitor for that UE's data. Transceiver 122 then transmits (318) downlink data to each of localized transmission UEs 101, 102 in the PRBs 411, 414 respectively allocated to the UE and transmits downlink data to each of distributed transmission UEs 103-105 in the sub-carriers designated for downlink transmission of data to the UE in each of PRBs 412, 413, and 415. Logic flow diagram 300 then ends (320).

Figures 6, 7:
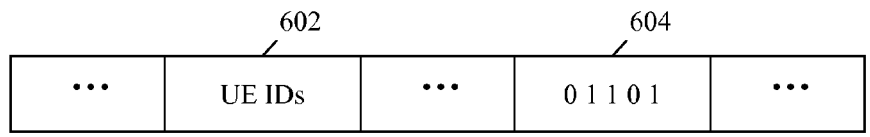
FIG. 6 is a block diagram of an exemplary control message that may be broadcast by a transceiver of FIG. 1 and that identifies a mapping of Distributed Virtual Resource Blocks to Physical Resource Blocks in accordance with an embodiment of the present invention.
FIG. 7 is an exemplary table comprising a bitmap that identifies a mapping of Distributed Virtual Resource Blocks to Physical Resource Blocks in accordance with an embodiment of the present invention.

For example, FIG. 6 is a block diagram of an exemplary control message 600 that may be broadcast by transceiver 122 and that identifies a mapping of DVRBs to PRBs in accordance with an embodiment of the present invention. Control message 600 may be broadcast by transceiver 122 using the DL L1/L2 control channel when the transceiver dynamically determines which PRBs are scheduled for localized and distributed transmission. Control message 600 includes a first data field 602 comprising an identifier (for example, UE_ID) associated with each intended recipient of the message, that is, each UE 103-105 scheduled for distributed transmission. Based on the UE IDs, each UE 103-105 is able to determine its position relative to the other distributed transmission UEs 103-105. For example, if a value of a UE's identifier is less than (or greater than, depending upon the designer of system 100) the values of the identifiers of all other UEs listed in data field 602, then the UE determines that it is a first UE of the listed UEs. If a value of the UEs identifier is less than (or greater than) the values of all but one other identifier listed in data field 602, then the UE determines that it is a second UE of the listed UEs, and so on. Similar calculations may be made by transceiver 122 so that the transceiver knows where, in each distributed transmission PRB 412, 413, 415, to transmit each UE's 103-105 downlink data.

Control message 600 further includes a second data field, that is, a PRB allocation data field, 604. PRB allocation data field 604 informs of the PRBs allocated for distributed transmission and may include a bitmap having bits that correspond to the PRBs allocated for distributed transmissions. More particularly, as depicted in control message 600, each bit of data field 604 informs whether a corresponding sub-band, or PRB 411-415, is scheduled for localized transmission or distributed transmission. For example, a setting of a bit to '0' indicates that the corresponding PRB is scheduled for localized transmission and a setting of a bit to '1' indicates that the corresponding PRB is scheduled for distributed transmission. When a UE activates in communication system 100, the UE is provided configuration data that includes sub-band indices. Thus, an order of the sub-bands, or PRBs, of bandwidth 420 are fixed and known in advance to each of transceiver 122 and UEs 101-105, and whether each PRB is scheduled for localized transmission or distributed transmission can be determined from data field 604.

When a distributed transmission UE 103-105 receives the control message broadcast by transceiver 122, the UE determines, based on the control message, its position among the UEs scheduled for distributed transmissions and further determines the PRBs allocated for distributed transmissions. Thus each UE 103-105 is able to determine that it is scheduled for distributed transmission and, based on the determination of the UE's position and the PRBs designated for distributed transmissions (and a number of DVRBs per UE if the UEs can have different numbers of DVRBs), to determine the PRBs 412, 413, 415 reserved for distributed transmissions and the sub-carriers of each PRB to monitor for downlink data for that UE.

For example, again referring to FIG. 4 and based on control message 600, UE 103 may determine that it is a first UE of three UEs scheduled for distributed transmissions and that PRBs 412, 413, 415 have been reserved for distributed transmissions. UE 103 may further determine, based on the determination that three UEs are scheduled for distributed transmissions, that the sub-carriers of each distributed transmission PRB 412, 413, 415 are divided into three parts and that UE 103's data will be included in a first part, for example, a first one-third, of the sub-carriers of each designated PRB 412, 413, 415 (for example, a first four sub-carriers in the event each PRB comprises 12 sub-carriers). Similarly, UE 104 may determine that it is a second UE of three UEs scheduled for distributed transmissions, that PRBs 412, 413, 415 have been reserved for distributed transmissions, and that UE 104's data will be included in a second part, or a second one-third, of the sub-carriers of each designated PRB 412, 413, 415. UE 105 may determine that it is a third UE of three UEs scheduled for distributed transmissions, that PRBs 412, 413, 415 have been reserved for distributed transmissions, and that UE 105's data will be included in a third part, or a third one-third, of the sub-carriers of each designated PRB 412, 413, 415.

The first, second, and third parts of each distributed transmission PRB may be determined in accordance with any one of many algorithms that may occur to one of ordinary skill in the art and that are stored in the at least one memory devices 126, 204 of each of transceiver 122 and UEs 101-105, so long as a same algorithm is used by the transceiver and the UEs. For example, a first part may comprise the highest frequency sub-carriers of a sub-band, a second part may comprise the middle frequency sub-carriers of the sub-band, and a third part may comprise the lowest frequency sub-carriers of the sub-band. In another example, a first part may comprise first OFDM symbols in a sub-frame, a second part may comprise middle OFDM symbols of a sub-frame, and the third part may comprise the last OFDM symbols of a sub-frame. In other embodiments of the present invention, some sub-carriers of a PRB may not be used in order to provide frequency spacings among the parts of a PRB allocated to the distributed transmission UEs. Further, when a number of UEs may not evenly divide a number of sub-carriers of a PRB, then some sub-carriers of the PRB may not be used for a transmission of downlink data or parts of a PRB that are allocated to some UEs may include a different number of sub-carriers than parts of the PRB that are allocated to one or more other UEs.

In yet another embodiment of the present invention, wherein the PRBs allocated for localized transmissions and distributed transmissions are predetermined, or pre-reserved, each of transceiver 122 and UEs 101-105 may maintain, in their respective memory devices 126, 204, a bitmap listing multiple combinations of PRB sub-carrier allocations. For example, when a UE activates in communication system 100, the UE may be informed of which PRBs are reserved for localized transmissions, for example, PRBs 411 and 414, and which PRBs are reserved for distributed transmissions, for example, PRBs 412, 413, and 415, using the P-BCH or S-BCH. This information may conveyed to the UE as part of the system configuration information. The UE is further conveyed the bitmap listing multiple combinations of PRB sub-carrier allocations. When transceiver 122 subsequently schedules UEs for distributed and localized transmissions, the transceiver need only convey, to the UEs scheduled for distributed transmissions, an index to a row of the bitmap in order to inform the UEs of the PRB sub-carriers allocated to each UE.

For example, FIG. 7 is an exemplary table 700 that indicates how a bitmap may be assembled in accordance with such an embodiment of the present invention. A first column 702 of table 700 is an index to the rows of a bitmap 706. This index is based on a number of DVRBs (or UEs if each UE is given one DVRB, as in the example) scheduled for distributed transmissions ('$N_{DVRB}$,' or 'N_DVRB'). For example, a first row 711 of table 700 corresponds to a single UE being scheduled for a distributed transmission, a second row 712 of table 700 corresponds to two UEs being scheduled for distributed transmissions, and a third row 713 of table 700 corresponds to three UEs being scheduled for distributed transmissions.

A second column 704 of table 700 is a skip, or spacing, factor ('S'). The spacing factor is an index to, that is, a spacing among, the sub-carriers comprising downlink data in each PRB reserved for distributed transmissions. The spacing factor is determined based on $N_{DVRB}$ and the total number of PRBs in a given frequency bandwidth. Column 706 then comprises a bitmap, wherein each row of bitmap 706 lists one of multiple combinations of PRB sub-carrier allocations. The length of the bitmap is the total number of PRBs in a given frequency bandwidth. Each row of bitmap 706 may then be determined based upon the number of DVRBs (or UEs if each UE is given one DVRB, as in the example) scheduled for distributed transmissions and the skip factor associated with that row. Bitmap 706 assumes that each PRB comprises 12 sub-carriers; however, one of ordinary skill in the art would realize that similar bitmaps may be determined of any number of sub-carriers.

For example, when a single UE is scheduled for a distributed transmission (N_DVRB=1) (row 711), the spacing factor (S=12) indicates that only a first sub-carrier of each distributed transmission PRB will include data for the UE. Correspondingly, in row 711 of table 700, bitmap 706 comprises the bits '1 0 0 0 0 0 0 0 0 0 0 0.' By way of another example, when two UEs are scheduled for a distributed transmission (N_DVRB=2) (row 712), the spacing factor (S=6) indicates a spacing of six sub-carriers between each sub-carrier comprising downlink data, that is, only a first sub-carrier and a seventh sub-carrier of each distributed transmission PRB will include data for the UEs. That is, the first sub-carrier of each distributed transmission PRB will include data for a first UE of the two UEs and a seventh sub-carrier of each distributed transmission PRB will include data for a second UE of the two UEs. Correspondingly, in row 712 of table 700, bitmap 706 comprises the bits '1 0 0 0 0 0 1 0 0 0 0 0.' By way of yet another example, when three UEs are scheduled for a distributed transmission (N_DVRB=3) (row 713), the skip factor (S=4) indicates that a first sub-carrier, a fifth sub-carrier, and a ninth sub-carrier of each distributed transmission PRB will include data for the UEs. That is, a first sub-carrier of each distributed transmission PRB will include data for a first UE of the three UEs, a fifth sub-carrier of each distributed transmission PRB will include data for a second UE of the three UEs, and a ninth sub-carrier of each distributed transmission PRB will include data for a third UE of the three UEs. Correspondingly, in row 713 of table 700, bitmap 706 comprises the bits '1 0 0 0 1 0 0 0 1 0 0 0.'

The rows of the above bitmap may be generated based on the following equations:

$$S = \left\lceil \frac{N_{PRB}}{N_{DPRB}} \right\rceil$$

$$j = i \cdot S$$

$$i = 0, 1, 2, \ldots \left\lceil \frac{N_{PRB}}{S} \right\rceil - 1$$

$$j = \mathrm{mod}(i \cdot S, N_{PRB} - 1) \; i \text{ otherwise}$$

where j is the part, or sub-carrier, of each PRB comprising downlink data, i is a counter corresponding to the number of DVRBs, and $N_{PRB}$ is the total number of PRBs in the frequency bandwidth. However, in yet another embodiment of the present invention, each of transceiver 122 and UEs 101-105 may store, in their respective memory devices 126, 204, the above equations instead of bitmap 706. As each UE 101-105 maintains a record of the number of PRBs in a given frequency bandwidth, transceiver 122 need only inform, via a control message, each UE scheduled for distributed transmission of a number of UEs scheduled for distributed transmissions in order for the UE to generate a pertinent row of bitmap 706 based on the above equations. Again, as noted above, such a control message may be broadcast by the transceiver and need merely include the UE identifiers of each UE scheduled for distributed transmission (assuming a same number of DVRBs per UE), thus allowing each such UE to generate the pertinent row of the table and determine the sub-carrier to be monitored by the UE.

By use of the bitmap and/or equations and the relative positions of the UEs 103-105 scheduled for distributed transmissions, transceiver 122 is able to determine where, in each PRB 412, 413, 415, that is, in which part of each PRB, to transmit each UE's downlink data. Similarly, by use of the bitmap and/or equations and the relative positions of the UEs 103-105 scheduled for distributed transmissions, each UE 103-105 is able to determine what part of each PRB 412, 413, 415 to monitor to receive the UE's downlink data.

Combinations of the above methods are also possible in various embodiments of the present invention. For example, the number of DVRBs is broadcast, and from this the set of PRBs for distributed transmission is known. A UE receives a control assignment indicating a PRB and where, if the PRB is in the set of PRBs for distributed transmission, the UE will receive a distributed transmission. If the maximum number of parts a DVRB may be sub-divided into is three, the PRBs for distributed transmission may be sub-divided into groups of three PRBs. The PRBs of the group may be separated by a known number of PRBs, or may be closest members of the set of PRBs for distributed transmission, or the like.

By assigning downlink PRBs to users scheduled for a localized transmission to produce reserved and non-reserved PRBs and then assigning the non-reserved PRBs to users scheduled for a distributed transmission, communication system 100 provides a method for scheduling both Distributed Virtual Resource Blocks (DVRB) and Localized Virtual Resource Blocks (LVRB) in a same frequency channel, thereby obtaining the benefits of frequency selective scheduling while minimizing the uplink feedback overhead. Communication system 100 informs each user scheduled for a distributed transmission of the non-reserved PRBs via a control message that is broadcast to the users. The control message may comprise identifiers associated with the user scheduled for a distributed transmission and a bitmap identifying the non-reserved PRBs, and based on the identifiers and bitmap a user scheduled for a distributed transmission is able to determine where, in the frequency channel, to monitor for the user's data.

In another embodiment of the present invention, communication system 100 may pre-reserve PRBs for localized and distributed transmissions, assigning one or more PRB pre-reserved for localized transmission to each user given an LVRB, that is, scheduled for a localized transmission, and assigning parts of multiple PRBs pre-reserved for distributed transmission to each user given a DVRB, that is, scheduled for a distributed transmission. Each user scheduled for a distributed transmission may determine what parts, of the PRBs pre-reserved for distributed transmission, to monitor for downlink data based on a control message broadcast to the users or based on a bitmap or algorithm stored by an associated UE and by a transceiver transmitting the data.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. The terms "including" and/or "having," as used herein, are defined as comprising. The term "coupled," as used herein, is defined as connected, although not necessarily directly, and not necessarily mechanically. An element preceded by " . . . a" does not, without more constraints, preclude the existence of additional identical elements in the process, method, article, or apparatus that the element. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for resource allocation in an Orthogonal Frequency Division Multiplexing communication system comprising:
   scheduling at least one user equipment for a localized transmission and at least one user equipment for a distributed transmission;
   assigning one or more downlink Physical Resource Blocks (PRBs) of a plurality of downlink PRBs to each user equipment scheduled for a localized transmission to produce at least one localized transmission Physical Resource Block (PRB) and a plurality of non-localized transmission PRBs;
   dividing the plurality of non-localized transmission Physical Resource Blocks (PRBs) into a plurality of groups of PRBs based on a number of distributed virtual resource blocks (DVRBs) being greater than a number of parts that a distributed virtual resource block (DVRB) can be sub-divided into; and
   assigning a part of each PRB within one or more of the plurality groups of PRBs of the plurality of non-localized transmission PRBs to a user equipment scheduled for a distributed transmission, wherein one or more of the at least one localized transmission PRBs are pre-reserved for localized transmission and one or more of the plurality of non-localized transmission PRBs are pre-reserved for distributed transmissions.

2. The method of claim 1, wherein assigning one or more downlink Physical Resource Block (PRB) of a plurality of downlink Physical Resource Blocks (PRBs) to each user equipment scheduled for a localized transmission comprises mapping a Localized Virtual Resource Block associated with each user equipment scheduled for a localized transmission to a downlink PRB and wherein assigning a part of each PRB of the plurality of non-localized transmission PRBs to a user equipment scheduled for a distributed transmission comprises mapping a Distributed Virtual Resource Block associated with each user equipment scheduled for a distributed transmission to a plurality of non-localized transmission downlink PRBs.

3. The method of claim 2, wherein each Distributed Virtual Resource Block is sub-divided into a plurality of parts of equal size.

4. The method of claim 2, wherein each Distributed Virtual Resource Block is sub-divided into a plurality of parts of equal size except for one part of a larger size.

5. The method of claim 1, wherein each Physical Resource Block (PRB) of a group of Physical Resource Blocks (PRBs) is separated from the other PRBs of the group of PRBs by a known number of PRBs.

6. The method of claim 1, wherein a Physical Resource Block assigned for a distributed transmission is sub-divided into a plurality of parts and wherein each part of the plurality of parts comprises one or more of:

sub-carriers of frequencies different from the frequencies of the sub-carriers included in the other parts of the plurality of parts; and Orthogonal Frequency Division Multiplexing (OFDM) symbols of a sub-frame different from the OFDM symbols of a sub-frame included in the other parts of the plurality of parts.

7. The method of claim 1, further comprising informing each user equipment scheduled for a distributed transmission of a plurality of non-localized transmission Physical Resource Blocks (PRBs) allocated to the user equipment by conveying a broadcast control message comprising an index to a PRB combination from among a plurality of PRB combinations.

8. The method of claim 1, further comprising:
storing, by each user equipment scheduled for a distributed transmission, an algorithm for determining a part of each Physical Resource Block (PRB) of the plurality of non-localized transmission Physical Resource Blocks (PRBs) that is used to transmit downlink data;
determining, by each user equipment scheduled for a distributed transmission, a part of each PRB of the plurality of non-localized transmission PRBs to monitor for downlink data based on the algorithm.

9. A network element capable of operating in an Orthogonal Frequency Division Multiplexing communication system, the network element configured to schedule at least one user equipment for a localized transmission and at least one user equipment for a distributed transmission, assign one or more downlink Physical Resource Blocks (PRBs) of a plurality of downlink PRBs to each user equipment scheduled for a localized transmission to produce at least one localized transmission Physical Resource Block (PRB) and a plurality of non-localized transmission PRBs, dividing the plurality of non-localized transmission Physical Resource Blocks (PRBs) into a plurality of groups of PRBs based on a number of distributed virtual resource blocks (DVRBs) being greater than a number of parts that a distributed virtual resource block (DVRB) can be sub-divided into, and assign a part of each PRB within one or more of the plurality groups of the PRBs of the plurality of non-localized transmission PRBs to a user equipment scheduled for a distributed transmission, wherein one or more of the at least one localized transmission PRBs are pre-reserved for localized transmission and one or more of the plurality of non-localized transmission PRBs are pre-reserved for distributed transmissions.

10. The network element of claim 9, wherein the network element is configured to assign a downlink Physical Resource Block (PRB) of a plurality of downlink Physical Resource Blocks (PRBs) to each user equipment scheduled for a localized transmission by mapping a Localized Virtual Resource Block associated with each user equipment scheduled for a localized transmission to a downlink PRB and wherein the transceiver is configured to assign a part of each PRB of the plurality of non-localized transmission PRBs to a user equipment scheduled for a distributed transmission by mapping a Distributed Virtual Resource Block associated with each user equipment scheduled for a distributed transmission to a plurality of non-localized transmission downlink PRBs.

11. The network element of claim 10, wherein the network element further is configured to sub-divide a each Distributed Virtual Resource Block into a plurality of parts of equal size.

12. The network element of claim 10, wherein the network element further is configured to sub-divide each Distributed Virtual Resource Block into a plurality of parts of equal size except for one part of a larger size.

13. The network element of claim 9, wherein the network element further is configured separate to each Physical Resource Block (PRB) of a group of Physical Resource Blocks (PRBs) from the other PRBs of the group of PRBs by a known number of PRBs.

14. The network element of claim 9, wherein the network element further is configured to sub-divide a Physical Resource Block assgned for a distributed transmission into a plurality of parts and wherein each part of the plurality of parts comprises one or more of:
sub-carriers of frequencies different from the frequencies of the sub-carriers included in the other parts of the plurality of parts; and
Orthogonal Frequency Division Multiplexing (OFDM) symbols of a sub-frame different from the OFDM symbols of a sub-frame included in the other parts of the plurality of parts.

15. The network element of claim 9, further comprising broadcasting a control message to each user equipment scheduled for a distributed transmission, which message is used by the user equipment scheduled for a distributed transmission to determine a part of each non-localized transmission Physical Resource Block (PRB) allocated to the user equipment and wherein the message comprises an index to a PRB combination from among a plurality of PRB combinations.

16. The network element of claim 9, wherein the network element further is configured to store an algorithm for determining a part of each Physical Resource Block (PRB) of the plurality of non-localized transmission Physical Resource Blocks (PRBs) that is used to transmit downlink data and to determine, based on the algorithm, to transmit downlink data in selected parts of each PRB of the plurality of non-localized transmission PRBs based on the bitmap and a number of user equipment scheduled for distributed transmissions.

17. The method of claim 1, further comprising stealing, for assignment to a user equipment scheduled for a localized transmission, one or more Physical Resource Blocks (PRBs) of the at least one Physical Resource Block (PRB) pre-reserved for distributed transmission.

18. The method of claim 17, wherein stealing comprises stealing, for assignment to a user equipment scheduled for a localized transmission, one or more Physical Resource Blocks (PRBs) of the at least one Physical Resource Block (PRB) pre-reserved for distributed transmission when a number of users equipment (UEs) scheduled for localized transmission is greater than a number of PRBs pre-reserved for a localized transmission.

19. The network element of claim 9, wherein the network element further is configured to steal, for assignment to a user equipment scheduled for a localized transmission, one or more Physical Resource Blocks (PRBs) of the at least one Physical Resource Block (PRB) pre-reserved for distributed transmission.

20. The network element of claim 19, wherein network element is configured to, steal, for assignment to a user equipment scheduled for a localized transmission, one or more Physical Resource Blocks (PRBs) of the at least one Physical Resource Block (PRB) pre-reserved for distributed transmission when a number of users equipment (UEs) scheduled for localized transmission is greater than a number of PRBs pre-reserved for a localized transmission.

21. The network element of claim 9, wherein the members of a group of Physical Resource Blocks (PRBs) are selected based on their proximity to each other.

* * * * *